US010775258B2

(12) United States Patent
Muralidhar et al.

(10) Patent No.: US 10,775,258 B2
(45) Date of Patent: Sep. 15, 2020

(54) HEURISTIC BASED ANALYTICS FOR GAS LEAK SOURCE IDENTIFICATION

(71) Applicant: International Business Machines Corporation, Armonk, NY (US)

(72) Inventors: Ramachandran Muralidhar, Mahopac, NY (US); Josephine B. Chang, Ellicott City, MD (US); Siyuan Lu, Yorktown Heights, NY (US); Theodore van Kessel, Millbrook, NY (US); Hendrik F. Hamann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/919,405

(22) Filed: Mar. 13, 2018

(65) Prior Publication Data

US 2019/0285504 A1 Sep. 19, 2019

(51) Int. Cl.
*G01M 3/04* (2006.01)
*G01P 5/00* (2006.01)
*G01P 13/02* (2006.01)

(52) U.S. Cl.
CPC .............. *G01M 3/04* (2013.01); *G01P 5/00* (2013.01); *G01P 13/025* (2013.01)

(58) Field of Classification Search
CPC ... G01M 3/04; G01N 33/004; G01N 33/0047; G01P 5/00; G01P 13/025
See application file for complete search history.

(56) References Cited

U.S. PATENT DOCUMENTS

| | | | | | |
|---|---|---|---|---|---|
| 3,852,730 | A | * | 12/1974 | Commins | G01N 33/0062 340/870.05 |
| 5,157,261 | A | * | 10/1992 | Grey | G01N 21/643 250/227.18 |
| 5,297,421 | A | * | 3/1994 | Hosonuma | G01P 13/02 73/40 |
| 5,364,795 | A | * | 11/1994 | Sausa | G01N 21/631 250/461.1 |

(Continued)

OTHER PUBLICATIONS

Kiemle et al., "Potential of Spaceborne Lidar Measurements of Carbon Dioxide and Methane Emissions from Strong Point Sources," Remote Sensing, 2017, 9, 1137 (Nov. 2017) (16 total pages).

(Continued)

*Primary Examiner* — David J Bolduc
(74) *Attorney, Agent, or Firm* — Randall Bluestone; Michael J. Chang, LLC

(57) ABSTRACT

Heuristic-based techniques for gas leak source identification are provided. In one aspect, a method for identifying a location of a gas leak source includes: obtaining gas sensor data and wind data synchronously from a gas leak detection system having a network of interconnected motes comprising gas sensors and wind sensors, with the gas sensors arranged around possible gas leak sources in a given area of interest; identifying the location of the gas leak source using the gas sensor data and wind data; and determining a magnitude of gas leak from the gas leak source using the location of the gas leak source and a distance d between the location of the gas leak source and a select one of the gas sensors from which the gas sensor data was obtained. A gas leak detection system is also provided.

18 Claims, 12 Drawing Sheets

(56) References Cited

U.S. PATENT DOCUMENTS

| | | | | |
|---|---|---|---|---|
| 5,604,299 | A * | 2/1997 | Cobb | G01N 1/26 73/31.02 |
| 5,728,584 | A * | 3/1998 | Sausa | G01N 21/631 250/282 |
| 5,866,430 | A * | 2/1999 | Grow | G01N 21/65 436/172 |
| 6,125,710 | A * | 10/2000 | Sharp | G01N 1/26 73/863.01 |
| 6,167,766 | B1 * | 1/2001 | Dunn | G01N 1/18 73/863.01 |
| 6,532,801 | B1 * | 3/2003 | Shan | G01M 3/22 73/170.04 |
| 6,772,071 | B2 * | 8/2004 | Gilbert | G01N 33/0004 702/23 |
| 6,895,335 | B2 | 5/2005 | Archibald et al. | |
| 7,057,721 | B2 * | 6/2006 | Gardner, Jr. | G01J 3/02 356/301 |
| H2208 | H | 1/2008 | Stytz et al. | |
| 7,333,190 | B1 * | 2/2008 | Pendell-Jones | G01J 3/4406 250/461.1 |
| 7,391,557 | B1 * | 6/2008 | Bruch | G01J 3/10 356/450 |
| 7,436,515 | B2 * | 10/2008 | Kaye | G01J 3/4406 356/436 |
| 7,511,809 | B2 * | 3/2009 | Schneider | G01N 1/2273 356/301 |
| 7,523,638 | B2 | 4/2009 | Prince | |
| 7,834,320 | B2 * | 11/2010 | Goldberg | G01N 21/78 250/338.5 |
| 7,968,054 | B1 * | 6/2011 | Li | G01N 27/127 422/68.1 |
| 8,805,613 | B2 | 8/2014 | Chainer et al. | |
| 8,949,037 | B2 | 2/2015 | Prince et al. | |
| 9,255,920 | B1 * | 2/2016 | Lamberti | G01N 33/0057 |
| 9,322,735 | B1 * | 4/2016 | Tan | F02M 65/006 |
| 9,429,522 | B2 * | 8/2016 | Swager | C07F 15/0086 |
| 9,562,852 | B1 | 2/2017 | Barwicz et al. | |
| 9,599,529 | B1 * | 3/2017 | Steele | G01N 25/20 |
| 9,683,981 | B1 * | 6/2017 | Vilkov | G01N 33/227 |
| 9,689,857 | B1 * | 6/2017 | Vilkov | G01N 33/227 |
| 9,766,220 | B2 | 9/2017 | Chang et al. | |
| 9,823,231 | B1 * | 11/2017 | Steele | F17D 5/02 |
| 9,857,267 | B1 * | 1/2018 | Nelson, Jr. | G01M 3/38 |
| 2004/0135684 | A1 | 7/2004 | Steinthal | B82Y 30/00 340/522 |
| 2004/0220753 | A1 * | 11/2004 | Tabe | G01N 33/0057 702/32 |
| 2005/0039515 | A1 * | 2/2005 | Prince | G01N 33/0057 73/1.06 |
| 2005/0230615 | A1 * | 10/2005 | Furutani | B82Y 10/00 250/287 |
| 2005/0263694 | A1 * | 12/2005 | Hayek | H01J 49/0036 250/287 |
| 2006/0047445 | A1 * | 3/2006 | Williams | G01N 21/274 702/30 |
| 2006/0188399 | A1 * | 8/2006 | Smid | G01N 29/12 422/82.02 |
| 2008/0085212 | A1 * | 4/2008 | Adams | G01N 27/007 422/50 |
| 2008/0088434 | A1 * | 4/2008 | Frieder | G08B 21/12 340/539.11 |
| 2008/0146892 | A1 * | 6/2008 | LeBoeuf | G16H 50/30 600/300 |
| 2008/0183389 | A1 * | 7/2008 | Chainer | G01W 1/00 702/2 |
| 2008/0195329 | A1 * | 8/2008 | Prince | G01N 33/0062 702/23 |
| 2008/0311882 | A1 * | 12/2008 | Schlager | A61N 1/08 455/404.2 |
| 2009/0115605 | A1 * | 5/2009 | Ravenis | G01N 27/126 340/540 |
| 2010/0000882 | A1 * | 1/2010 | Wang | G01N 33/0057 205/781 |
| 2010/0268480 | A1 * | 10/2010 | Prince | G01N 1/26 702/24 |
| 2011/0018996 | A1 * | 1/2011 | Mian | G08B 13/1672 348/143 |
| 2011/0045517 | A1 * | 2/2011 | Derringer | C12Q 1/46 435/20 |
| 2011/0127421 | A1 * | 6/2011 | Finlay | G01N 30/72 250/283 |
| 2012/0004851 | A1 * | 1/2012 | Potyrailo | G01N 33/0073 702/19 |
| 2012/0028820 | A1 * | 2/2012 | Rhodes | B82Y 15/00 506/9 |
| 2012/0038908 | A1 * | 2/2012 | Beckstead | G01J 3/02 356/72 |
| 2012/0122075 | A1 * | 5/2012 | Call | B01D 45/04 435/3 |
| 2012/0143515 | A1 * | 6/2012 | Norman | G01N 33/0073 702/24 |
| 2012/0270205 | A1 * | 10/2012 | Patel | G01N 27/126 435/5 |
| 2013/0115705 | A1 * | 5/2013 | Patolsky | G01N 27/4146 436/106 |
| 2014/0238107 | A1 | 8/2014 | Chou et al. | |
| 2014/0281479 | A1 * | 9/2014 | Gettings | G01N 33/0062 713/150 |
| 2015/0371386 | A1 * | 12/2015 | Zeng | G01S 5/0236 382/171 |
| 2016/0131624 | A1 * | 5/2016 | Naito | G01N 33/0006 702/50 |
| 2016/0202222 | A1 * | 7/2016 | Roberts | G01N 1/2202 435/5 |
| 2016/0282321 | A1 * | 9/2016 | Syage | H01J 49/10 |
| 2016/0290977 | A1 * | 10/2016 | Cogill | G01N 33/0004 |
| 2017/0191973 | A1 * | 7/2017 | Eusebi | G01N 33/0075 |
| 2017/0227428 | A1 * | 8/2017 | Massengale | G01N 1/2214 |
| 2017/0234757 | A1 * | 8/2017 | Wang | B64C 39/024 340/539.1 |
| 2017/0248514 | A1 * | 8/2017 | Pavey | G01N 33/0057 |
| 2017/0284887 | A1 * | 10/2017 | Miranda | G01M 3/04 |
| 2018/0136072 | A1 * | 5/2018 | Cabib | G01S 17/08 |
| 2018/0196101 | A1 * | 7/2018 | Qu | G01N 33/0057 |
| 2018/0217085 | A1 * | 8/2018 | Braun | C12Q 1/44 |
| 2018/0231514 | A1 * | 8/2018 | Kim | G01N 33/0063 |
| 2019/0003984 | A1 * | 1/2019 | Kester | G01J 5/0066 |
| 2019/0011417 | A1 * | 1/2019 | Trubey | G01N 33/0057 |
| 2019/0265123 | A1 * | 8/2019 | Rieker | G01M 3/38 |
| 2019/0340914 | A1 * | 11/2019 | Israelsen | G01M 3/22 |

OTHER PUBLICATIONS

Han et al., "Spatial Clustering Methods in Data Mining: A Survey," Geographic Data Mining and Knowledge Discovery (Jan. 2001) (29 total pages).

A. Venkatram et al., "Modeling Dispersion at distances of meters from urban sources," Atmospheric Environment 38 (Sep. 2004) pp. 4633-4641.

P. Bhaumik et al., "A location-aided content searching mechanism for large mobile ad hoc network using geographic clusters," Distributed Computing and Networking, 2008, pp. 570-580.

S. Zhuk et al., "On gas leak source localisation under incomplete knowledge of wind field," IBM Research, Apr. 27, 2015, researcher. watson.ibm.com/researcher/files/ie-sergiy.zhuk/paper_inverse_problems_15.pdf.pdf, downloaded Aug. 19, 2015 (18 pages).

Z. Yong et al., "An indoor gas leakage source localization algorithm using distributed maximum likelihood estimation in sensor networks," Journal of Ambient Intelligence and Humanized Computing, Nov. 2017, 10 pages.

* cited by examiner $$Q = \pi \sigma_S^2 U_\theta c_S$$

$$\sigma_S = \frac{\sigma_v r}{U_\theta}$$

HEURISTIC BASED ANALYTICS FOR GAS LEAK SOURCE IDENTIFICATION

STATEMENT OF GOVERNMENT RIGHTS

This invention was made with Government support under Contract number DE-AR0000540 awarded by Department of Energy. The Government has certain rights in this invention.

FIELD OF THE INVENTION

The present invention relates to identifying a gas leak source, and more particularly, to heuristic-based techniques for gas (e.g., methane) leak source identification.

BACKGROUND OF THE INVENTION

Conventional source identification methods work with a Gaussian plume dispersion Model. See, for example, Kiemle et al., "Potential of Spaceborne Lidar Measurements of Carbon Dioxide and Methane Emissions from Strong Point Sources," Remote Sensing, 2017, 9, 1137 (November 2017) (16 total pages). The Gaussian plume model however needs quasi steady state assumption or wind conditions that are fixed in space and for a sufficient length of time for the Gaussian plume to develop from averaging of stochastic instantaneous plume trajectories.

Further, while the Gaussian plume model has been successfully used in atmospheric pollution dispersion over longer length and time scales, the Gaussian plume is an idealized condition and may not be applicable at shorter time and length scales.

These drawbacks have led to the development of alternative analytics for source identification. These techniques however still require knowledge of a plume dispersion model to localize the source. At short length scales (e.g., less than 50 meters) typical Gaussian plume dispersion models are unreliable and plume characteristics have upwind migration.

Therefore, improved source identification techniques would be desirable.

SUMMARY OF THE INVENTION

The present invention provides heuristic-based techniques for gas leak source identification. In one aspect of the invention, a method for identifying a location of a gas leak source is provided. The method includes: obtaining gas sensor data and wind data synchronously from a gas leak detection system having a network of interconnected motes comprising gas sensors and wind sensors, with the gas sensors arranged around possible gas leak sources in a given area of interest; identifying the location of the gas leak source using the gas sensor data and wind data; and determining a magnitude of gas leak from the gas leak source using the location of the gas source and a distance d between the location of the gas leak source and a select one of the gas sensors from which the gas sensor data was obtained.

In another aspect of the invention, a gas leak detection system is provided. The gas leak detection system includes: a network of interconnected motes having gas sensors and wind sensors, with the gas sensors arranged around possible gas leak sources in a given area of interest; and at least one processor device, coupled to a memory, the processor device being implementable to: obtain gas sensor data and wind data synchronously from the gas sensors and wind sensors; identify a location of a gas leak source using the gas sensor data and wind data; and determine a magnitude of gas leak from the gas leak source using the location of the gas leak source and a distance d between the location of the gas leak source and a select one of the gas sensors from which the gas sensor data was obtained.

A more complete understanding of the present invention, as well as further features and advantages of the present invention, will be obtained by reference to the following detailed description and drawings.

DETAILED DESCRIPTION OF PREFERRED EMBODIMENTS

Provided herein are heuristic-based techniques for methane ($CH_4$) or other gas leak source location identification that work without a dispersion model and at a short timescale (e.g., from about 1 hour (hr.) to about 4 hrs., and ranges therebetween) and a short lengthscale (e.g., from about 10 meters (m) to about 100 m, and ranges therebetween). Specifically, the present techniques involve use of a spatially distributed array of gas sensors in conjunction with wind direction and speed sensors to estimate the location of a gas leak in proximity to the sensor array in short timescale and lengthscale.

Figure 1:
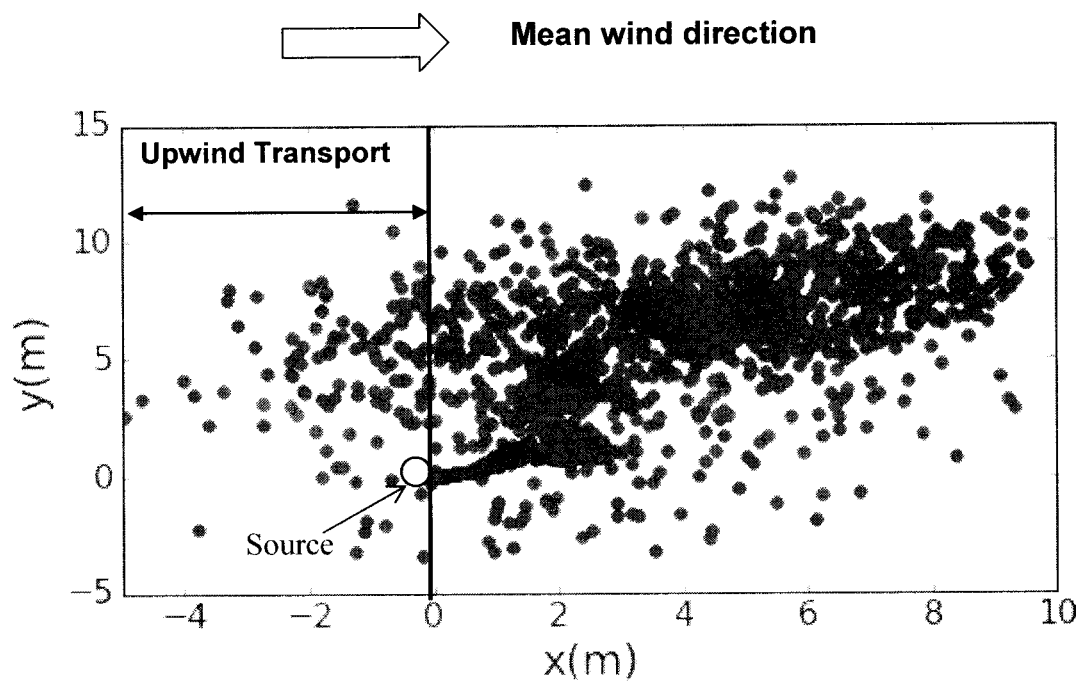
FIG. 1 is a diagram illustrating how short timescale and lengthscale dispersion of a gas shows a stochastic plume and upwind migration according to an embodiment of the present invention.
Figure 2:
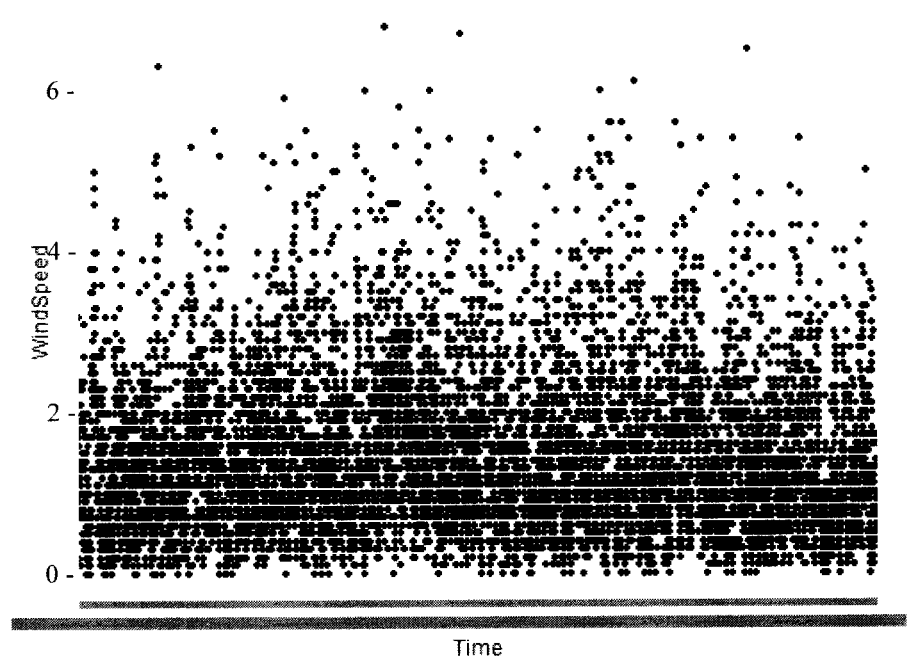
FIG. 2 is a time series illustrating that windspeed is stochastic in the short timescale and lengthscale according to an embodiment of the present invention.
Figure 3:
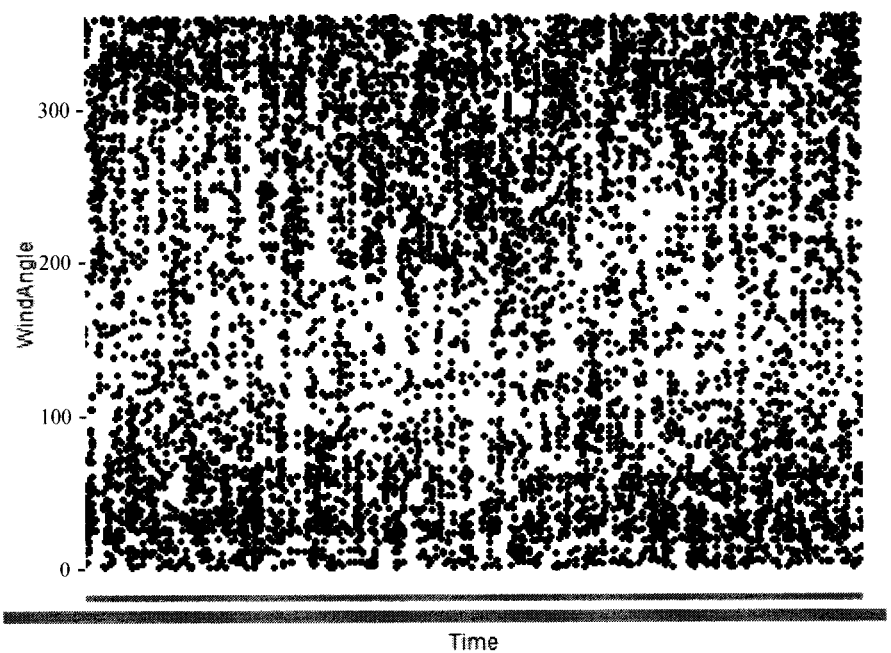
FIG. 3 is a time series illustrating that wind angle is stochastic in the short timescale and lengthscale according to an embodiment of the present invention.

Short timescale and lengthscale dispersion of a gas (such as $CH_4$) shows a stochastic plume and upwind migration. See, for example, FIG. 1. As shown in FIG. 1, a meandering plume is most likely to occur in a short length scale (here about 15 m×20 m) with some upwind migration, i.e., gas particles transported upwind from the source. The time series shown in FIG. 2 and FIG. 3 show that both the windspeed and wind angle (direction), respectively, vary significantly (i.e., are stochastic) in short timescale and lengthscale. Thus, under such conditions, i.e., short timescale and lengthscale, the gaussian plume model does not apply.

Figure 4:
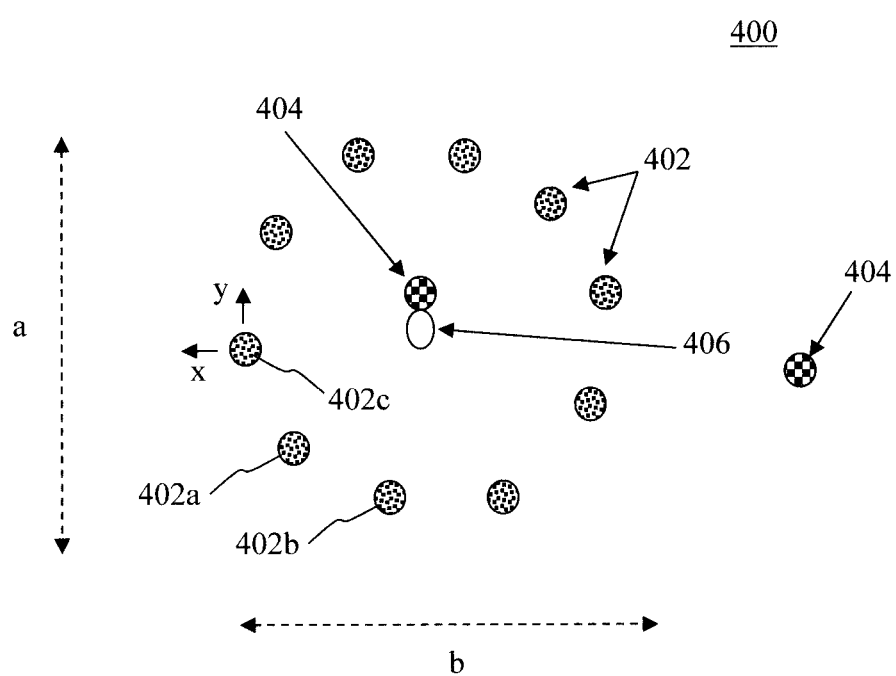
FIG. 4 is a diagram illustrating an exemplary gas leak detection system according to an embodiment of the present invention.

An exemplary detection system 400 for gas leak source location identification in accordance with the present techniques is shown illustrated in FIG. 4. As shown in FIG. 4, system 400 includes a network of motes 402 and 404. The term "mote" in the context of our preferred embodiment refers to a quasi-independent system element comprising a gas sensor, power source network connection and computation element with appropriate interfacing. According to an exemplary embodiment, motes 402 are arranged circumferentially around at least one gas leak source 406. Each mote 402 contains at least one gas sensor. By way of example only, suitable gas sensors include, but are not limited to, methane, carbon dioxide and/or carbon monoxide gas sensors. For instance, a gas sensor that can be used in accordance with the present techniques is described, for example, in U.S. Pat. No. 9,562,852 issued to Barwicz et al., entitled "Gas Sensor with Integrated Optics and Reference Cell," the contents of which are incorporated by reference as if fully set forth herein.

More generally, however, any type of commercially-available gas sensor(s) can be used in each of the motes 402. For instance, methane and other hydrocarbon gas detectors are available from Pem-Tech, Inc., Sugar Land, Tex. Carbon dioxide and carbon monoxide gas detectors are available from Honeywell International Inc., Morris Plains, N.J.

Configurations are contemplated herein wherein at least one of the motes 402 includes multiple gas sensors. For example, each of the motes can include at least one first sensor for detecting a first gas and at least one second sensor for detecting a second gas, and so on. Methane, carbon dioxide and/or carbon monoxide, for instance, were given above as examples. In that case, system 400 can be used to detect the leak sources of multiple, different gases.

Further, while each of the motes 402 can include the same gas sensor (or combination of gas sensors), this is not a requirement, and embodiments are contemplated herein where at least one of the motes 402 includes a different sensor (or a different combination of sensors) from at least one other of the motes 402. For instance, by way of example only, one mote 402a can include the at least one first sensor for detecting the first gas and another mote 402b can include the at least one second sensor for detecting the second gas. Additionally, the motes 402a and 402b can alternate along the circumference of motes 402 around the gas leak source 406.

While the motes 402 are shown in FIG. 4 as a circle surrounding the at least one gas leak source 406 this is only an example. In general, a perimeter of motes 402 of any shape that surround the at least one gas leak source 406 is within the scope of the present teachings. A circular configuration is, however, preferable due to the inevitable capture of information at any wind angle. Any arrangement of more than 1 mote that occupies a non-zero spatial extent will be practical given sufficient observation time. If there is local knowledge of prevailing wind direction, the physical placement of motes can be optimized to take advantage of this knowledge by arranging some of them downwind from probable leak sites. According to an exemplary embodiment, the motes 402 enclose an area a×b wherein a and b are each from about 50 m to about 100 m, and ranges therebetween. See FIG. 4. By way of example only, the circular perimeter of motes 402 formed as shown in FIG. 4 can surround an area a×b of from about 50 m×50 m to about 100 m×100 m, and ranges therebetween.

Preferably, the motes 402 fully surround the at least one gas leak source 406 as shown in FIG. 4. That way, gas leaking from the source 406 can be detected in whatever direction the wind is blowing. Of course, since the goal is to pinpoint the gas leak source, one cannot presuppose its location. However, areas containing possible gas leak sources can be identified and the motes 402 then assembled around these areas. For instance, the area might include a well pad that has been prepared for natural gas extraction. Equipment used in the extraction process (and located in the well pad area) can be possible gas leak sources. System 400 can be employed to pinpoint gas leak sources in the equipment.

According to an exemplary embodiment, at least one of the motes 402 and/or 404 are mobile meaning that the location of the mobile mote(s) can be changed on-the-fly such as by attachment of the mote to a vehicle or other motorized platform. See, for example, mote 402c in FIG. 4 which has a position (x,y) that can be changed in relation to the other motes 402. That way, the configuration, placement, location, etc. of the perimeter of motes 402 can be changed, expanded, reduced, etc. on-the-fly as conditions or other requirements change. For instance, the instantiation of a new well at a pad site can be accommodated by automatically expanding the perimeter of the motes 402 (as opposed to a manual reconfiguration) to accommodate the new well.

According to an exemplary embodiment, each of the motes 404 includes at least one wind direction and wind speed sensor. Typically, wind direction is measured using a wind vane and wind speed is measured using an anemometer. Combined wind vane/anemometers are commercially available, for example, from Campbell Scientific, Inc., Logan Utah. In one exemplary embodiment an ultrasonic wind sensor is used that provides wind speed and direction in 3 dimensions. Further, as shown in FIG. 4, multiple motes 404 can be employed in system 400, for example, with at least one of the motes 404 being within the perimeter of motes 402, and at least another one of the motes 404 being outside of the perimeter of motes 402. Further, according to an exemplary embodiment, one of the motes 404 is located adjacent to each (potential) gas leak source 406. As provided above, the motes 402 and 404 can be mobile which facilitates optimizing position of the motes 402 and 404 with respect to gas leak source(s) 406 at a given site. In one exemplary embodiment a single wind sensor is used in combination with multiple gas sensing motes.

Figure 5:
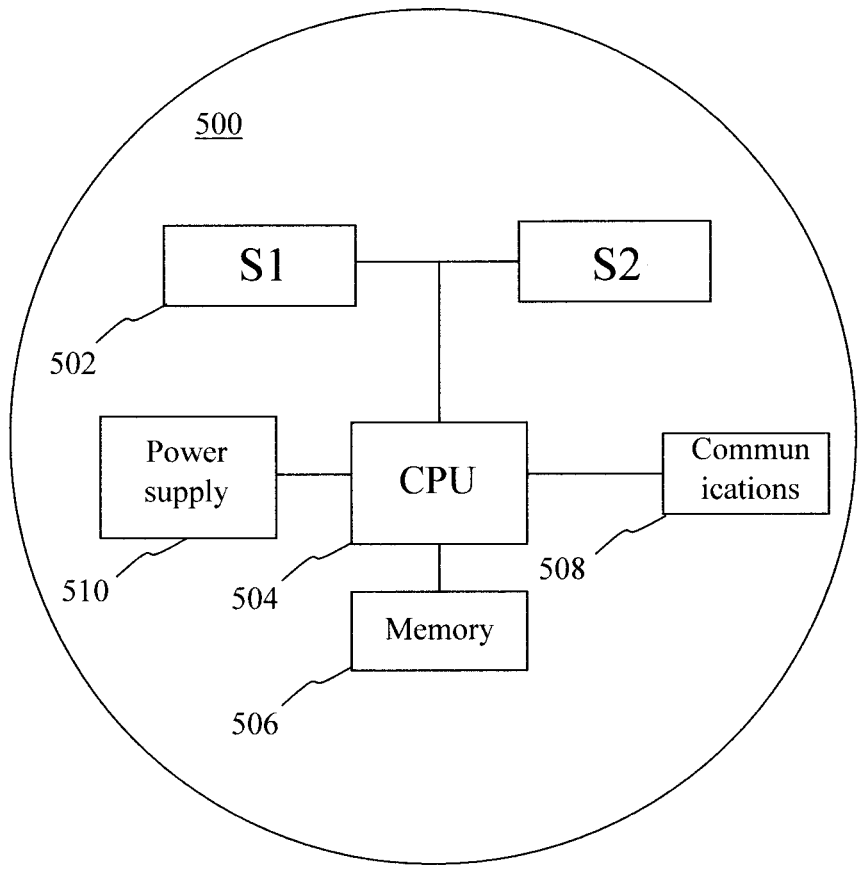
FIG. 5 is a diagram illustrating an exemplary mote that can be used in the present gas leak detection system according to an embodiment of the present invention.

An exemplary mote 500 is shown in FIG. 5 that may be used in accordance with the present techniques. Mote 500 is representative of any of the motes 402 and/or 404 described in accordance with the description of FIG. 4, above. Thus, for instance, as shown in FIG. 5, mote 500 includes at least one sensor 502. Generally, sensor(s) 502 represent any of the above-described sensors, such as gas and wind sensors. Optionally, each mote 500 can include multiple sensors 502 (labeled here as sensor S1 and sensor S2). For instance, as provided above, each mote can include a first sensor(s) to detect a first gas, a second sensor(s) to detect a second gas, and so on.

Mote 500 can include data processing (e.g., central processing unit (CPU) 504) and/or data storage (e.g., memory 506) capabilities. By way of example only, data from the sensor(s) 502 can be analyzed via CPU 504 and the results and/or the data itself can be stored in the memory 506. As will be described in detail below, data communication occurs between motes and/or between the motes and a central base station, with data transfer occurring at certain times, intervals, etc. Data waiting to be transferred is stored in the memory 506.

Data transfer is carried out via a communications module 508. The communications module 508 can transmit data between motes 500 and/or between the motes 500 and a base station. See below. While this data communication can occur over a wired connection, in order to facilitate use of the present system in the field wireless transmission of data is preferred. For instance, according to an exemplary embodiment, communications module 508 transmits data via radio transmitters. In an alternate embodiment the communications module 508 includes a cellular modem and the base station is a remote cloud computer center. In alternate embodiments, the communications module 508 includes one of ZigBee®, and LARA long range radio transmitters.

Power for the sensor(s) 502, CPU 504, memory 506 and communication module 508 is provided by power supply 510. See FIG. 5. In general, any suitable power supply may be employed including that provided by conventional power utilities such as from a building's power supply. However, in order to facilitate use of the present system in the field, it is preferable for each of the motes 500 to contain its own power source. Thus, according to an exemplary embodiment, power supply 510 is a battery. Optionally, the battery can be rechargeable via an alternative renewable power source, such as solar power. A battery with integrated photovoltaics is described, for example, in U.S. patent application Ser. No. 15/281,870 by Antunez et al., entitled "Integrated CZT(S,Se) Photovoltaic Device and Battery," the contents of which are incorporated by reference as if fully set forth herein. In one exemplary embodiment a lead acid battery is used with a silicon based photovoltaic and power optimizing charging system that operates close to the maximum power point of the photovoltaic panel. In this embodiment, the lead acid battery is preferred due to its low temperature performance for remote winter sites of operation. In alternate embodiments for warmer climates, lithium batteries are used for their higher storage capacity.

In order to conserve (e.g., battery) power, operations such as data transfer are preferably carried out at specific times and/or specific intervals rather than continuously streaming the data. For instance, in one exemplary embodiment, data transfer from the motes 500 occurs whenever a sensor 502 detects the presence of its target analyte gas. Wind sensor data will be available most of the time, even in the absence of a gas leak. However, as will be described in detail below, the relevant wind (speed/direction) data is that which is synchronized with (i.e., collected at the same time as) the gas sensor data—in order to be able to pinpoint the location of the source. Thus, transmission of data from the wind sensors can be limited to times when data from the gas sensors is also being transmitted.

Figure 6:
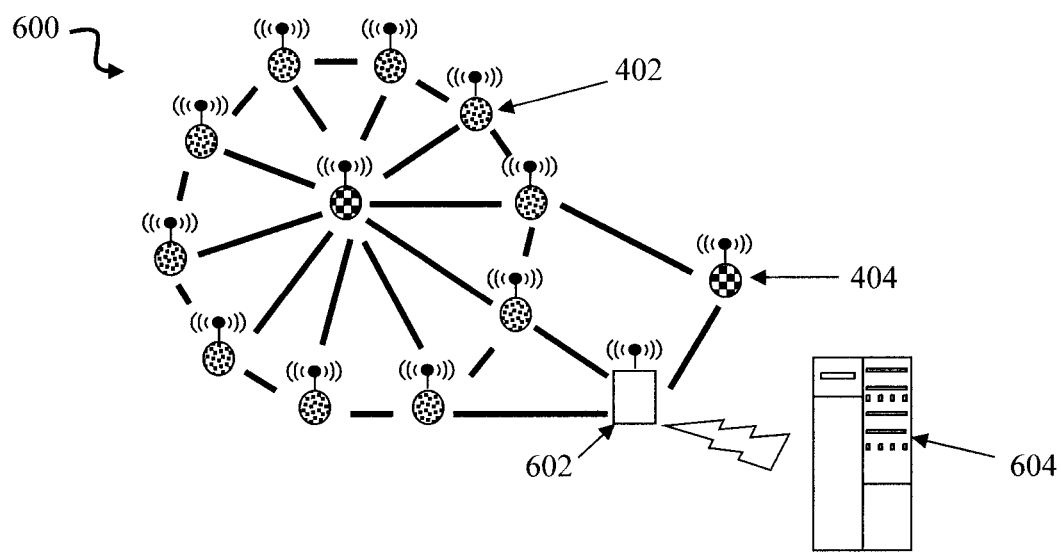
FIG. 6 is a diagram illustrating an exemplary gas leak detection system including a mesh network of interconnected wireless sensors according to an embodiment of the present invention.

According to an exemplary embodiment, the motes form a mesh network of interconnected wireless sensors as shown in system 600 of FIG. 6. For illustrative purposes only, system 600 includes motes 402 and 404 arranged as described in conjunction with the description of FIG. 4, above. Further, each of the motes 402 and 404 is configured as described in conjunction with the description of FIG. 5, above. Each mote 402/404 is configured to communicate wirelessly (e.g., via a communication module 508) with every other mote 402/404 and/or with a base station 602. As shown in FIG. 6, data communication between the motes 402/404 and/or between the motes 402/404 and the base station 602 occurs either directly (i.e., directly from one mote to another mote or to the base station 602) or indirectly (i.e., data is transferred from one mote to another or to the base station 602 through at least one other mote). Solid lines are used in FIG. 6 to indicate these communication pathways.

The base station 602 is in communication with a database server 604. An apparatus that can be configured to serve as the server 604 is described in conjunction with the description of FIG. 20, below. Server 604 receives the sensor data from the motes 402/404 via the base station 602. The server 604 then identifies, based on the data, the gas leak source location. Exemplary methodologies for identifying the location of the gas leak source using the gas and wind sensor data are described in detail below.

Figure 7:
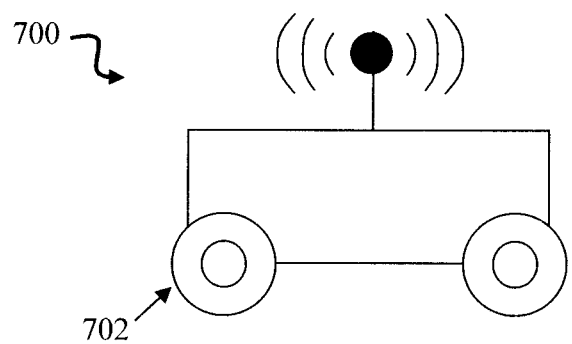
FIG. 7 is a diagram illustrating an exemplary mobile mote according to an embodiment of the present invention.

As provided above, one or more of the motes 402/404 can be mobile. See, for example, mobile mote 700 shown in FIG. 7. Mobile mote 700 includes all of the components described in conjunction with the description of mote 500 of FIG. 5, above. Additionally, mobile mote 700 is equipped with the means (in this case wheels 702) to automatically move the mote around. For instance, the server 604 may determine the ideal size and location of the perimeter for a given site, and then remotely direct the (mobile) motes to their specific locations along the perimeter.

Figure 8:
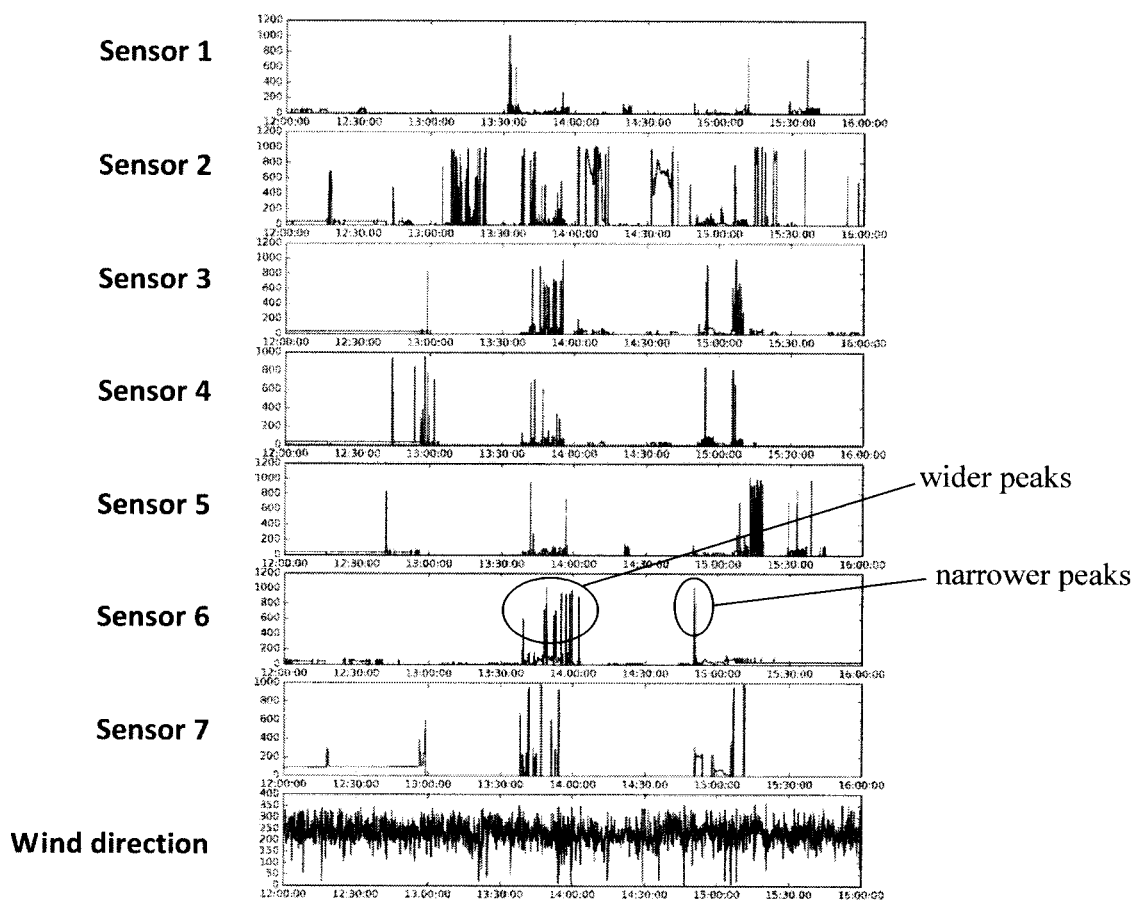
FIG. 8 is a diagram illustrating time synchronized gas sensor and wind sensor data over a sample 4 hour interval according to an embodiment of the present invention.

FIG. 8 is a diagram illustrating time synchronized gas sensor and wind sensor data over a sample 4 hour interval. As described above, the data was collected from seven ($CH_4$) gas sensors (Sensor 1-Sensor 7) arranged in a perimeter around a $CH_4$ gas source, and two wind sensors—one inside and one outside the perimeter of gas sensors. As shown in FIG. 8, the sensor peaks (i.e., indicating that the sensor detects the gas) occur at random meaning that, as described above, wind angle is stochastic in short timescale and lengthscale.

Useful gas leak information is carried in these observable sensor peaks. Namely, the presence of a peak at a given one of the gas sensors indicates that the gas has travelled from the leak source to the given sensor. Relatively larger, wider peaks indicate that the given sensor is upwind of the gas leak source. For instance, using the data from Sensor 6 in FIG. 8 as an example, the observable peaks between about 13:30:00 and about 14:00:00 are wider than the peak at about 14:45:00. As such, it may be assumed that, for the former, Sensor 6 was upwind from the leak source, and downwind for the latter. This makes sense since, upwind from the leak source, the gas is not being carried by the wind, and thus registers more peaks for a given duration at the (upwind) sensor. Conversely, downwind the gas is being carried by the wind past the (downwind) sensors, and thus registers fewer peaks for the same duration.

It is notable that the sensor time constant is less than the typical peak width. The sensor time constant is an amount of time it takes the sensor to measure values within its accuracy tolerance when responding to a change in the substance (e.g., gas) it is measuring. The typical peak width has a full width at half maximum (FWHM) of from about 5.0 seconds (s) to about 10.0 s, and ranges therebetween. Thus, the sensors can accurately detect the presence of the gas(es) in short timescale and lengthscale even when the wind angle is stochastic.

An exemplary process for using the data obtained from the above-described spatially distributed array of gas sensors and wind sensors to estimate the location of a gas leak is now described. Several assumptions are made. First, all gas leaks emit from a surface. Namely, gas leaks cannot appear in free space. Second, a detected peak at a given one of the gas sensors (i.e., a detection point) is the result of a gas leak at a surface point that took an approximately direct path to get from the leak point to the detection point. Third, the wind condition (i.e., wind direction and wind speed) during and just prior to a detected peak (at the detection point) indicates the most likely direction that the (gas) plume took to get from the location of the leak to the gas sensor at the detection point.

Figure 9:
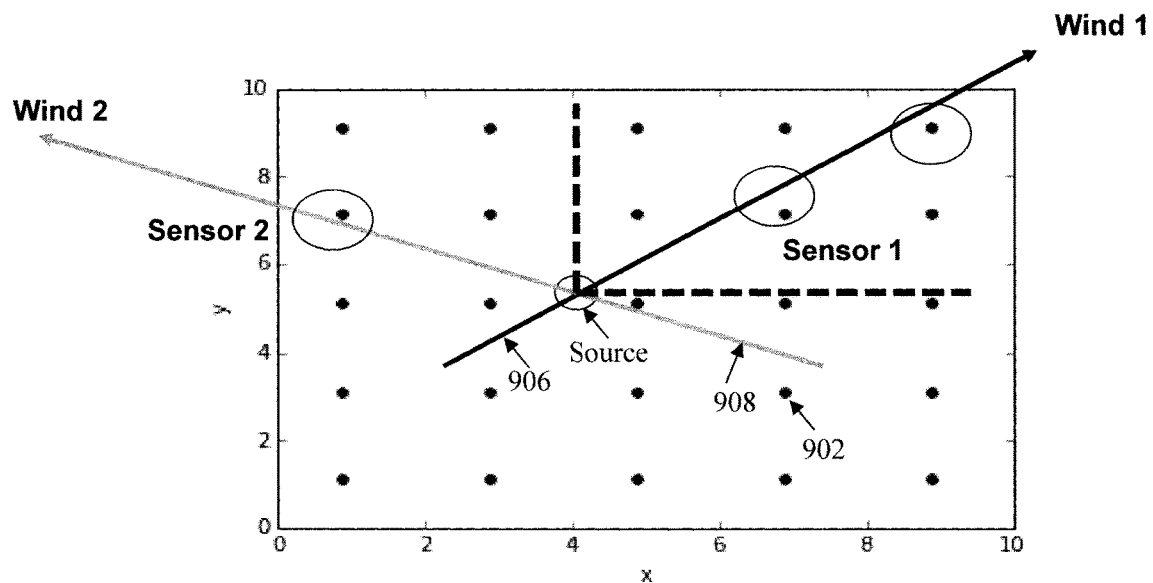
FIG. 9 is a diagram illustrating a heuristic-based approach for identifying a gas leak source according to an embodiment of the present invention.

FIG. 9 is a diagram illustrating the heuristic-based approach for identifying a gas leak source used in accordance with the present techniques. A grid of points 902 is used to indicate locations of motes (each having at least one gas sensor) in an area (x,y) such as a well pad site. As provided above, the motes with gas sensors form a perimeter around a gas leak source (labeled "source" in FIG. 9). Thus, the points 902 used in FIG. 9 are not necessarily meant to indicate that there is a gas sensor present at each point 902, but merely to orient the location of the sensors (see, e.g., "Sensor 1" and "Sensor 2") on the (x,y) grid. However, it is within the scope of the present techniques to include a sensor at each of the points 902, if so desired. In the description that follows, the terms "mote" and "sensor" are used interchangeably.

Assuming that gas is leaking from a surface point at the source, random wind (i.e., wind of a random direction and/or speed) can make the gas strike one of the sensors along the perimeter. Since the wind is random in the short timescale/lengthscale being observed (see above), the wind data is needed synchronously with the gas sensor data. That way, the wind conditions (i.e., direction and speed) can be known at precisely the time a gas sensor strike is registered. Thus, for instance, when sensor 1 in the present example sees a peak (e.g., at a time t1) the wind conditions including wind direction (i.e., "Wind 1") are obtained also at time t1 via the wind sensors. Similarly, when sensor 2 sees a peak (e.g., at a time t2) the wind conditions including wind direction (i.e., "Wind 2") are obtained also at time t2 via the wind sensors.

As provided above, it is assumed that the gas leak takes an approximately direct path to get from the leak point to the detection point (i.e., the gas sensor seeing a peak). Thus, the wind direction data (observed at the time of the gas sensor peak) provides an estimate of the likely direction the gas leak plume took to arrive at the sensor. In FIG. 9, the path of the gas leak plume is represented as a straight line passing through the source and the sensor at the detection point. See, for example, lines 906/908 passing through the source and Sensor 1/Sensor 2, respectively. Lines 904 and 906 have arrows indicating the corresponding wind directions Wind 1 and Wind 2, respectively. As shown in FIG. 9, the location of the leak can be determined by determining the intersection of the lines 904 and 906.

The location of the intersection point of the line 902 and 904 can be determined as follows. The wind direction angle, $\phi$, refers to the angle from which the wind blows, wherein 90, 180, 270, and 360 degrees imply East, South, West and North wind, respectively. The polar angle $\theta$ is given by:

$$\theta = 270 - \phi.$$

Given a wind direction, f, the slope of the line is given by:

$$\tan(\theta) = \tan(270 - \phi).$$

The equation of the line 906 passing through Sensor 1 with coordinates when wind direction is given by polar angle $\theta_1$ is given by:

$$y = \tan(\theta_1)x + (y_1 - \tan(\theta_1)x_1).$$

Similarly, for Sensor 2 corresponding to a different wind direction, $$y = \tan(\theta_2)x + (y_2 - \tan(\theta_2)x_2)$$

The leak source $(x_1, y_1)$ is identified as the intersection of these two lines:

$$x_1 = \frac{c_2 - c_1}{\tan\theta_1 - \tan\theta_2}$$

$$y_1 = \frac{\tan\theta_1 c_2 - \tan\theta_2 c_1}{\tan\theta_1 - \tan\theta_2},$$

wherein $c_1$ and $c_2$ are the intercepts of the 2 lines given by:

$$c_i = y_i - x_i \tan\theta_i, \text{ wherein } i = 1, 2.$$

Figure 10:
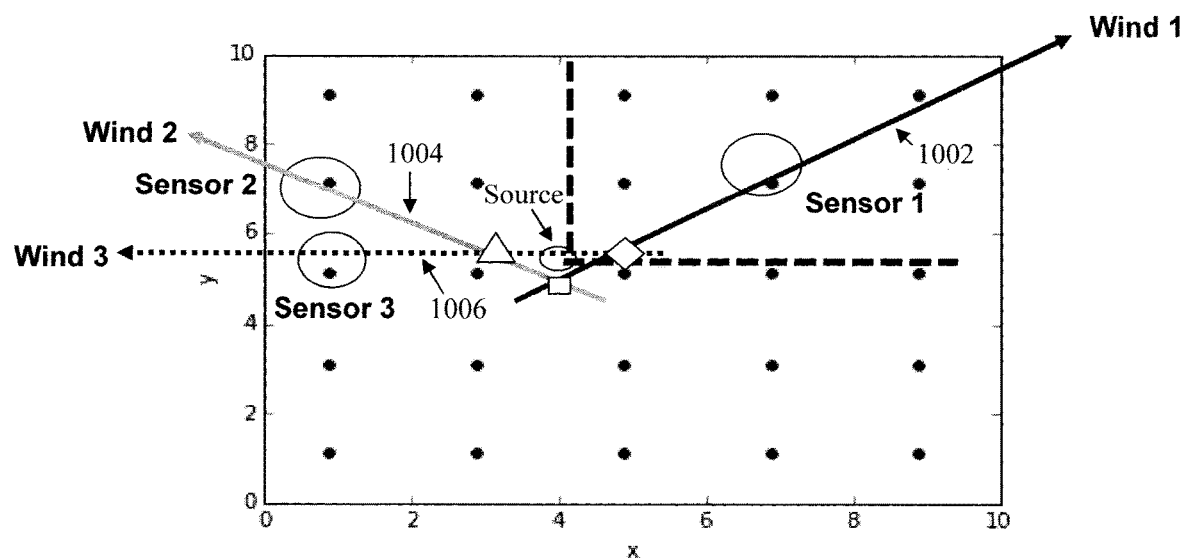
FIG. 10 is a diagram illustrating the heuristics involved with three sensors and three wind conditions according to an embodiment of the present invention.

FIG. 10 illustrates the heuristics involved with three sensors, i.e., Sensor 1, Sensor 2, and Sensor 3, and three wind conditions, i.e., wind direction Wind 1, Wind 2 and Wind 3, respectively. In the example described in conjunction with the description of FIG. 9 above, the intersection of two lines along the directions of wind travel that pass through the sensors at each detection point (i.e., the gas leak plume directions that cause a sensor peak—also referred to herein as "peak plume directions") is determined to be the leak location. Here, however, there are three lines 1002, 1004 and 1006 corresponding to the three sensors, i.e., Sensor 1, Sensor 2 and Sensor 3, respectively, registering peaks. The intersection point between any two of these lines is a possible location for the leak. For instance, the intersection of lines 1002 and 1004 indicates a location represented by a square, the intersection of lines 1002 and 1006 indicates a location represented by a diamond, and the intersection of lines 1004 and 1006 indicates a location represented by a triangle. The actual location of the leak ("source") lies in between these points.

Figure 11:
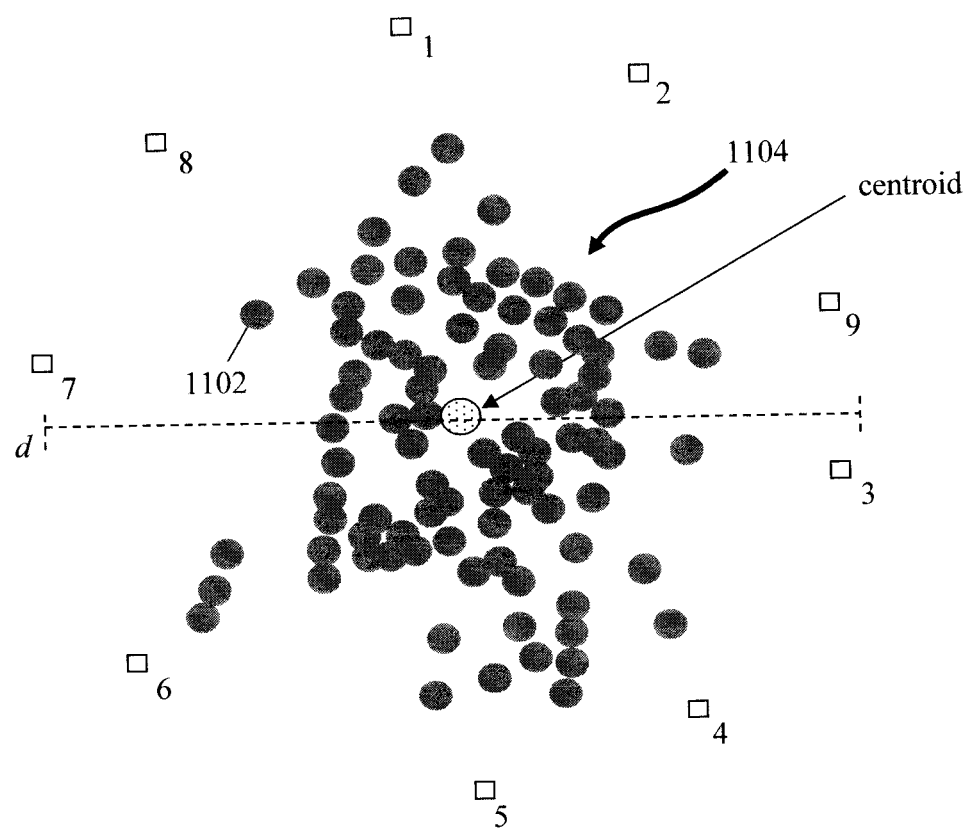
FIG. 11 is a diagram illustrating intersection points having been generated for all peak plume directions versus all other peak plume directions creating a point cloud according to an embodiment of the present invention.

This concept is expanded beyond three peak plume directions, such that intersection points are generated for all peak plume directions versus all other peak plume directions essentially creating a point cloud that corresponds to a likely source location. See, for example, FIG. 11. Each point 1102 in point cloud 1104 of FIG. 11 corresponds to an intersection point between a pair of the peak plume direction lines. As described above, the gas sensors (labeled 1-9) form a perimeter around a gas leak source (not labeled) which, in this example, is at approximately the center of the perimeter of gas sensors. Also in this example, the gas sensors form a circular perimeter having a diameter d of about 10 meters (m).

Each data point 1102 can be recorded in an accumulator, e.g., in server 604 of system 600 (see description of FIG. 6 above). An accumulator is a register file that stores intermediate computation results. The accumulated data points 1102 form the point cloud 1104. The centroid of the point cloud 1104 can then be determined to approximate the location of the leak source. The centroid is simply the mean x, y, and z coordinates of the data points 1102 that collectively make up the point cloud 1104. Thus, the more data points 1102 collected/accumulated, the greater the accuracy of the prediction. Preferably, the accuracy is such that the centroid is less than 0.5 m from the actual location of the leak.

For the above-described heuristics to work, any fluctuations should be small. For instance, the wind direction is essentially homogenous. That way, it can be assumed that, as highlighted above, a leak takes an approximately direct path from the leak point to the detection point (and thus can be represented using peak plume direction lines). Also, the wind direction auto-correlation time is long enough that the wind direction is essentially constant for the duration it takes for the gas plume to be transported from the source to the detecting sensor by convection (drift). Since the present techniques involve short lengthscale/timescales, this is a realistic assumption.

Figure 12:
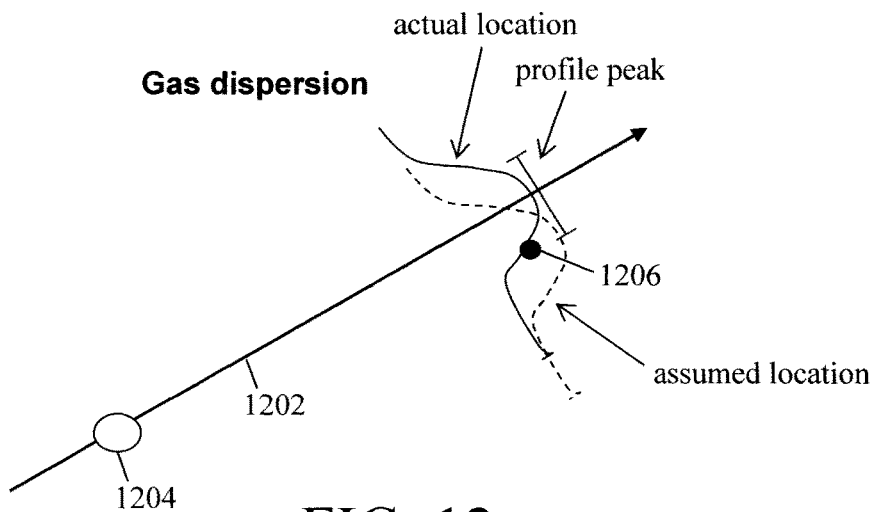
FIG. 12 is a diagram illustrating the gas plume profile perpendicular to the wind direction according to an embodiment of the present invention.

Further, it is assumed that the gas plume profile perpendicular to the wind direction peaks at the sensor location. See, for example, FIG. 12. In FIG. 12, the wind direction is shown by line 1202 indicating an approximately direct path from a leak point 1204 to a gas sensor 1206. The gas plume profile (labeled "Gas dispersion") perpendicular to the line 1202 peaks at (or near) the gas sensor 1206. However, as shown in FIG. 12, the sensor might not be in direct line with the path (i.e., as would be the case where line 1202 passes directly through the gas sensor 1206). Any such deviations can lead to errors in determining the intersection points. Namely, if it is assumed that the gas plume profile peaks at the sensor, then the assumed position of the plume relative to the sensor might actually be off from its actual location. See, for example, FIG. 12. However, techniques, such as cluster analysis and spatial filtering can be used to improve the estimation, for example, by eliminating outlying points.

Figure 13:
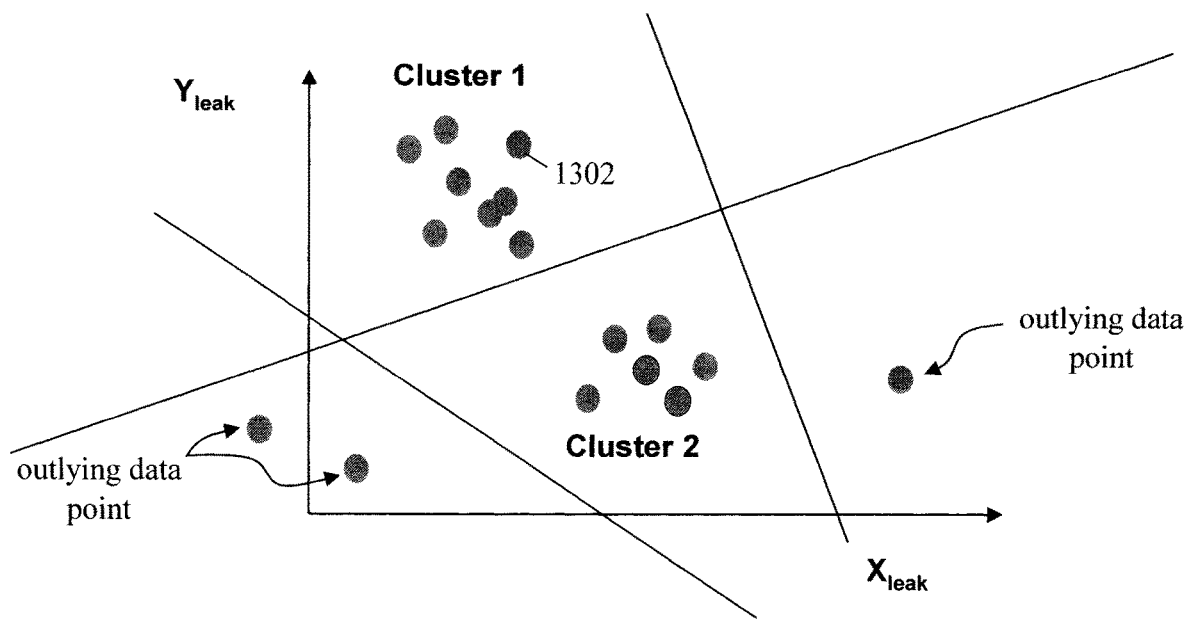
FIG. 13 is a diagram illustrating cluster analysis having been performed on the point cloud of intersection points according to an embodiment of the present invention.

Cluster analysis is shown illustrated schematically in FIG. 13. In the same manner as described above, a leak source location is identified based on the intersection points determined from pairwise sensor readings and wind conditions. As the wind conditions vary quite a lot in a short lengthscale/timescale, multiple different leak locations 1302 will likely be identified from these pairwise sensor readings. If there are N sensor peaks corresponding to N wind directions, then there will be N (N−1)/2 possible leak source location identifications using the pairwise sensor readings.

As shown in FIG. 13, a clustering technique can then be used to find clustering patterns for these leak source location identifications which will eliminate outlying points. For instance, in the example shown illustrated in FIG. 13, two clusters of data points are identified, i.e., a Cluster 1 and a Cluster 2. Outlying leak source location identification points, i.e., the data points outside of either Cluster 1 or Cluster 2 can be eliminated from consideration. Thus, in the present example, the actual location of the leak can be in i) Cluster 1, ii) Cluster 2, or iii) a combination of Cluster 1 and Cluster 2—such as at the center of Cluster 1 and Cluster 2. As provided above, the mean x, y, and z coordinates of the data points can be used to determine the centroid of the cluster(s) of the data points. Any suitable clustering method known in the art may be employed. See, for example, Han et al., "Spatial Clustering Methods in Data Mining: A Survey," Geographic Data Mining and Knowledge Discovery (January 2001), the contents of which are incorporated by reference as if fully set forth herein.

Figure 14:
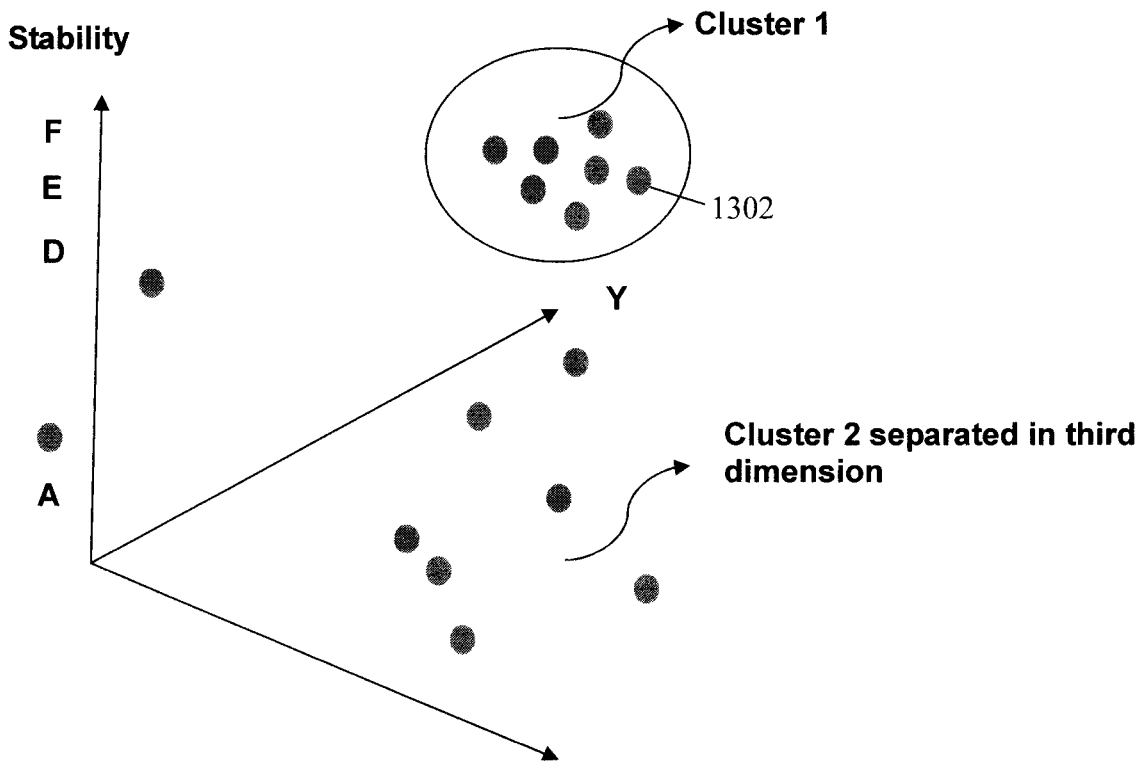
FIG. 14 is a diagram illustrating the feature vector having been analyzed in three dimensions to separate the clusters according to an embodiment of the present invention.

Further, the clustering analysis can be enhanced by increasing the dimensionality of the feature vector. For instance, what looks like a cluster in two dimensions (e.g., x and y) might change when the analysis is expanded to three dimensions. This information can help to separate the clusters. For example, using the clustering example described in conjunction with the description of FIG. 13 above, when the feature vector has two dimensions (x and y) there appears to be two distinct clusters of the data points 1302, Cluster 1 and Cluster 2 (see FIG. 13). However, when the feature vector is analyzed in three dimensions as shown in FIG. 14, Cluster 2 separates indicating that the leak source is most likely located at the center (centroid) of Cluster 1. By way of example only, in the scenario depicted in FIG. 14 atmospheric condition stability (labeled "Stability") provides the additional dimensionality. For example, when atmospheric conditions are stable (e.g., E or F), turbulence effects are small and the above-described stochasticity can be smaller on average. By way of example only, atmospheric condition stability can be assessed over different time periods. For instance, the data points 1302 collected over a 12 hour period might be analyzed against the stability of the atmospheric conditions at different times of the day during that period. For instance, the wind conditions might have been calmer in the morning than in the afternoon. Further, if the data points of Cluster 1 were collected in the morning, and those of Cluster 2 in the afternoon, this can indicate that Cluster 1 provides a more accurate estimation of the actual leak source location.

Figure 15:
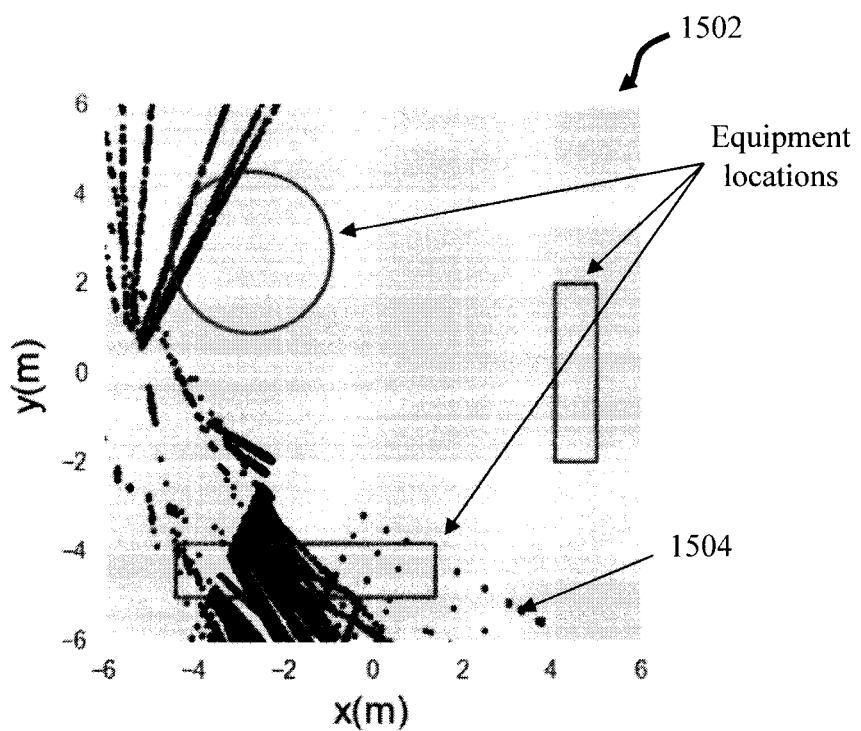
FIG. 15 is a diagram illustrating spatial filtering having been used to eliminate outlying data points according to an embodiment of the present invention.

With regard to spatial filtering, knowledge of a particular site can be used to filter-out (outlying) intersection points. For instance, if gas leaks are known to occur only at the location of equipment at the given site (i.e., the equipment are assumed to be the only potential locations of leak sources at the site), then intersection points can be eliminated which lie outside of the equipment locations. This concept is illustrated in FIG. 15. FIG. 15 illustrates an exemplary pad well pad site 1502. Boundaries are placed around the locations (labeled "Equipment locations") in the pad well site 1502 containing equipment. Intersection points 1504 are determined using the above-described techniques. However, only those intersection points 1504 within the equipment location boundaries are considered (i.e., all other outlying intersection points 1504 are excluded) thereby increasing the accuracy of the leak source location prediction. By way of example only, the remaining intersection points 1504—those within the equipment location boundaries—can then be subject to cluster analysis as described above.

Figure 16:
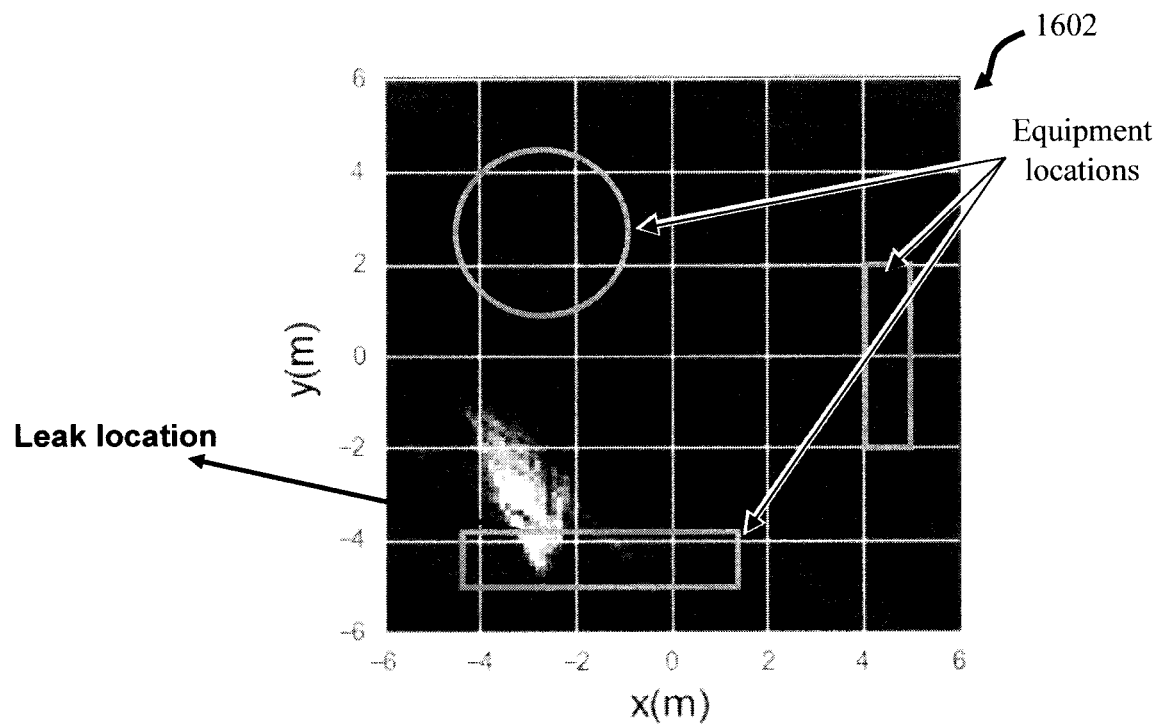
FIG. 16 is a diagram illustrating a heat map being used to identify the leak source based on density of intersection points according to an embodiment of the present invention.

Further, heat maps can be used to identify the leak source based on the location(s) having the highest density. See, for example, heat map 1602 shown in FIG. 16. A heat map is visual depiction of data where a diagram or 'map' represents the data values (in this case density of intersection points) as different colors and/or intensities. The same exemplary well pad site 1502 is used in the example in FIG. 16, where the equipment location boundaries have been highlighted. Heat map 1602 shows the intersection points 1504 (already spatially filtered as described in conjunction with the description of FIG. 15 above) in space with the highest concentration of intersection points 1504 at the 'leak location.'

Once the gas leak source location has been identified, the next task is to estimate the leak magnitude, i.e., the amount of the gas leaking from the source. According to an exemplary embodiment, the magnitude of the gas leak is determined based on the short scale plume characteristics and the notion that the radius of the gas plume grows linearly with distance from the leak source. As provided above, the location of the leak source has been determined. The location of the gas sensors registering peaks (relative to the source location) is also known. Thus, a diffusion model to determine magnitude can be created as illustrated in FIG. 17.

Figure 17:
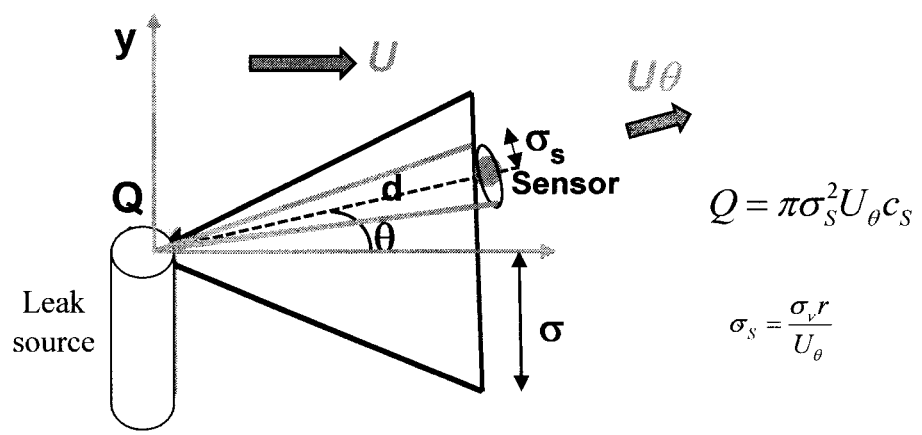
FIG. 17 is a diagram illustrating the determination of the leak magnitude according to an embodiment of the present invention.

Referring to FIG. 17, as provided above, it is assumed that the gas particles travel in a straight line path on average from the leak source to the sensors. That straight line path is shown with a dashed line in FIG. 17 from the source to a given one of the gas sensors that registered a peak. That sensor is located a distance d from the leak source along that path.

The sensor records a short time averaged (i.e., over a time interval of from about 5 seconds to about 15 minutes, and ranges therebetween) concentration of $C_S$ with a characteristic velocity fluctuation $\sigma_1$. The release rate Q can be determined as:

$$Q = \pi \sigma_S^2 U_\theta c_S,$$

where, in that time interval, the lateral plume spread (radius) is given by $\sigma_S$ (and the concentration across the plume is approximated as constant):

$$\sigma_S = \frac{\sigma_v r}{U_\theta},$$

wherein $U_\theta$ is the short time averaged wind speed in direction $\theta$.

Long time averaged concentrations (e.g., from about 0.5 hr. to about 1 hr., and ranges therebetween) can also be used to determine the magnitude of the leak. For instance, using an Air quality model with meandering (AQMM):

$$Q = \frac{r U_\theta c(r, \theta, z)}{P(\theta) S(z)},$$

wherein $P(\theta) = f_\theta P_g(\theta) + (1-f_\theta) P_u(\theta)$ with $f_\theta P_g(\theta)$ as the Gaussian component and $(1-f_\theta) P_u(\theta)$ as the Non-Gaussian component, and wherein $U_\theta = (U^2 + 2\sigma_u^2)^{0.5}$. The probability distribution of angle is a superposition of Gaussian and Uniform:

$$P_g(\theta) = \frac{1}{\sigma_\theta \sqrt{2\pi}} \exp\left(-\frac{\theta^2}{2\sigma_\theta^2}\right)$$

$$P_u(\theta) = \frac{1}{2\pi}$$

-continued $$\sigma_\theta = \frac{\pi}{\sqrt{3}} \tanh\left(\frac{\sigma_v \sqrt{3}}{U\pi}\right)$$

$$f_\theta = \left(\frac{\sigma_v}{U}\right)^2.$$

S(z) is a vertical dispersion factor as in plume dispersion models. Using each sensor mean concentration, an estimate of Q can be obtained.

Figure 18:
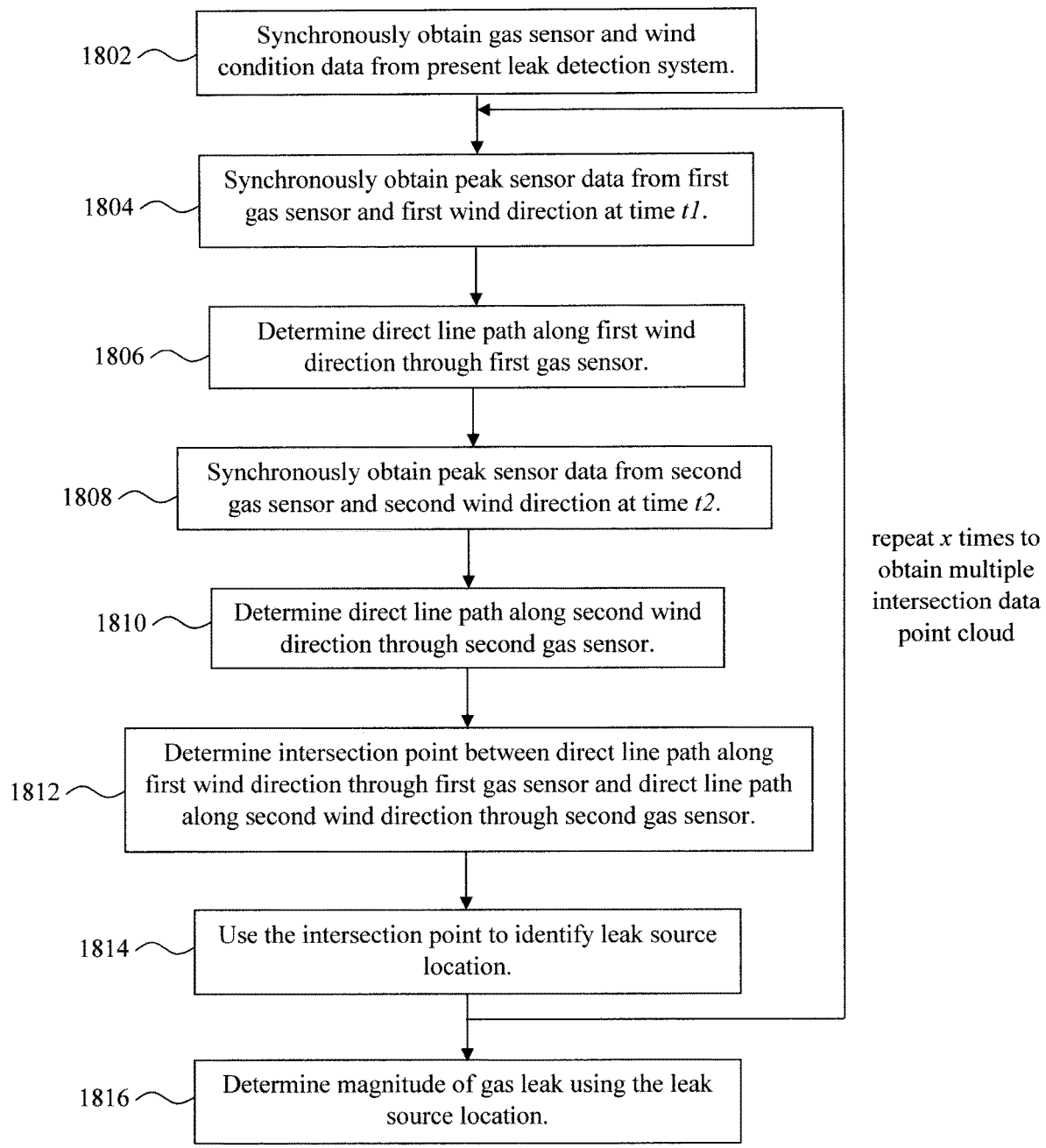
FIG. 18 is a diagram illustrating an exemplary methodology for leak source identification using intersection points according to an embodiment of the present invention.

FIG. 18 is a diagram illustrating an exemplary methodology 1800 for leak source location identification using the above-described techniques. In step 1802, the present leak detection system is used to synchronously obtain gas sensor data and wind condition data. As provided above, the present detection system includes a network of interconnected motes having gas sensors and wind sensors, with the gas sensors arranged in a perimeter around a leak source.

In step 1804, peak sensor data is obtained from at least a first one of the gas sensors synchronously with the wind data from the wind sensors indicating a first wind direction at a first time t1. In step 1806, a direct line path along the first wind direction through the first gas sensor is determined.

In step 1808, peak sensor data is obtained from at least a second one of the gas sensors synchronously with the wind data from the wind sensors indicating a second wind direction at a second time t2. In step 1810, a direct line path along the second wind direction through the second gas sensor is determined.

In step 1812, an intersection point between the direct line path along the first wind direction and the direct line path along the second wind direction is determined and, as described in detail above, in step 1814 that intersection point is used to identify the leak source location. For instance, as shown in FIG. 18, steps 1802-1812 can be iterated multiple times (i.e., over a given time interval) to obtain multiple intersection points. These intersection points can be accumulated (e.g., via an accumulator) to form a point cloud, which can then be processed using any of the above-described techniques such as by cluster analysis, spatial filtering, heat map representation, etc.

Once the location of the leak source has been identified, the magnitude of the gas leak can be determined in step 1816. The process for determining the gas leak magnitude using the leak source location and distance to the detection point(s) was described in detail above.

Figure 19:
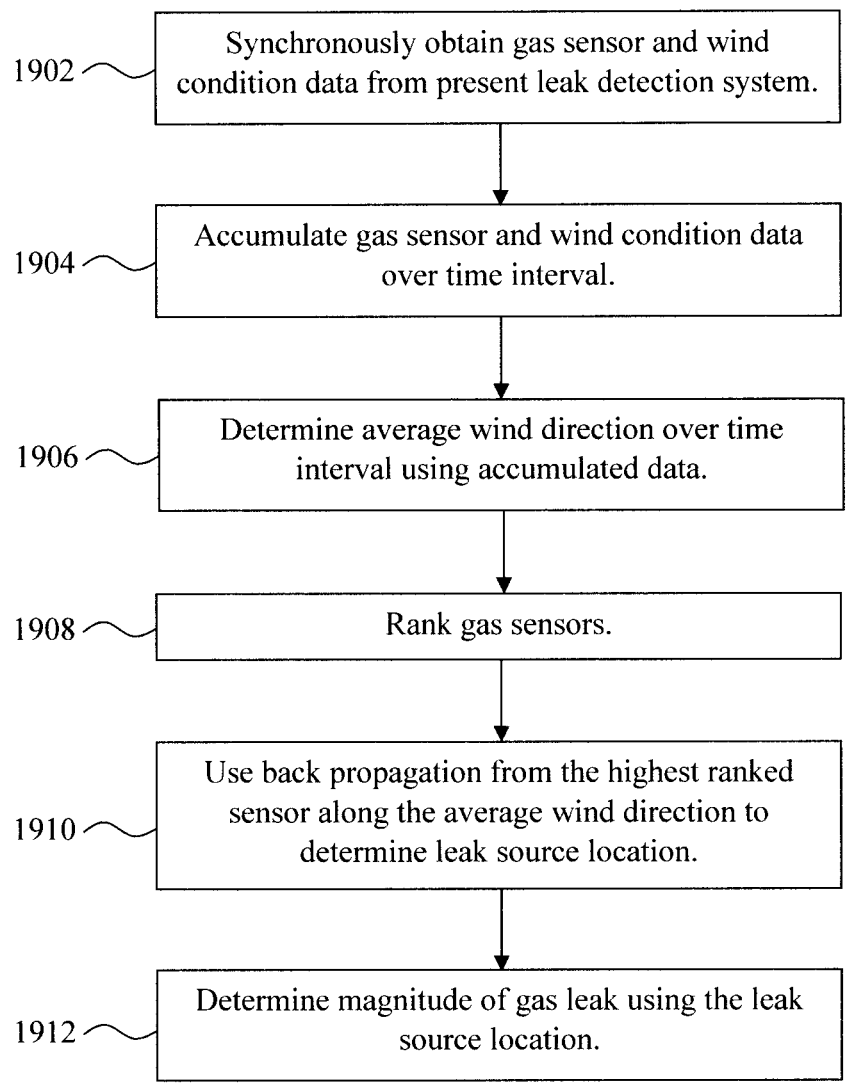
FIG. 19 is a diagram illustrating an exemplary methodology for leak source identification using back propagation according to an embodiment of the present invention.

In the exemplary embodiments presented above, the leak source location is estimated using the intersection points of direct line paths, along the wind direction, through the gas sensors. This is, however, only one possible techniques contemplated herein for using the gas sensor and wind condition data to trace a gas leak plume back to its source location. For instance, according to another exemplary embodiment, the accumulated wind direction and gas sensor peak data is used to rank the sensors and then, for the sensor receiving the greatest number of peaks, back propagation along a time averaged wind direction is used to trace the plume back to the source. See, for example, methodology 1900 of FIG. 19.

Specifically, in step 1902, the present leak detection system is used to synchronously obtain gas sensor data and wind condition data. As provided above, the present detection system includes a network of interconnected motes having gas sensors and wind sensors, with the gas sensors arranged in a perimeter around a leak source.

In step 1904, the gas sensor data and wind condition (i.e., wind direction and wind speed) data are accumulated over a given time interval using, for example, an accumulator (see above). According to an exemplary embodiment, the time interval is from about 5 seconds to about 15 minutes, and ranges therebetween. In step 1906, the accumulated wind condition data is used to determine an average wind direction over the time interval.

In step 1908, the gas sensors are ranked based on the number of peaks each gas sensor received during the given time interval. The goal is to identify the gas sensor that received the greatest number of peaks during that time interval. The accumulated gas sensor data can be employed to identify the gas sensor that received the most number of peaks during the time interval (highest ranked), the gas sensor that received the fewest number peaks (lowest ranked), and those in between. It is assumed that, on average, the wind direction mostly faces the highest ranking gas sensor since it is that sensor that received the greatest number of peaks.

In step 1910, back propagation from the sensor receiving the greatest number of peaks along the average wind direction (from step 1906) is used estimate the leak source location. As provided above, it is assumed that the gas leak takes a straight line path from the source to the detecting sensor. Back propagation is a machine-learning process that can be employed to determine a gradient (in this case of the gas plume) in its direct line path from the source to the highest ranked sensor.

Once the location of the leak source has been identified, the magnitude of the gas leak can be determined in step 1912. The process for determining the gas leak magnitude using the leak source location and distance to the detection point(s) was described in detail above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 20:
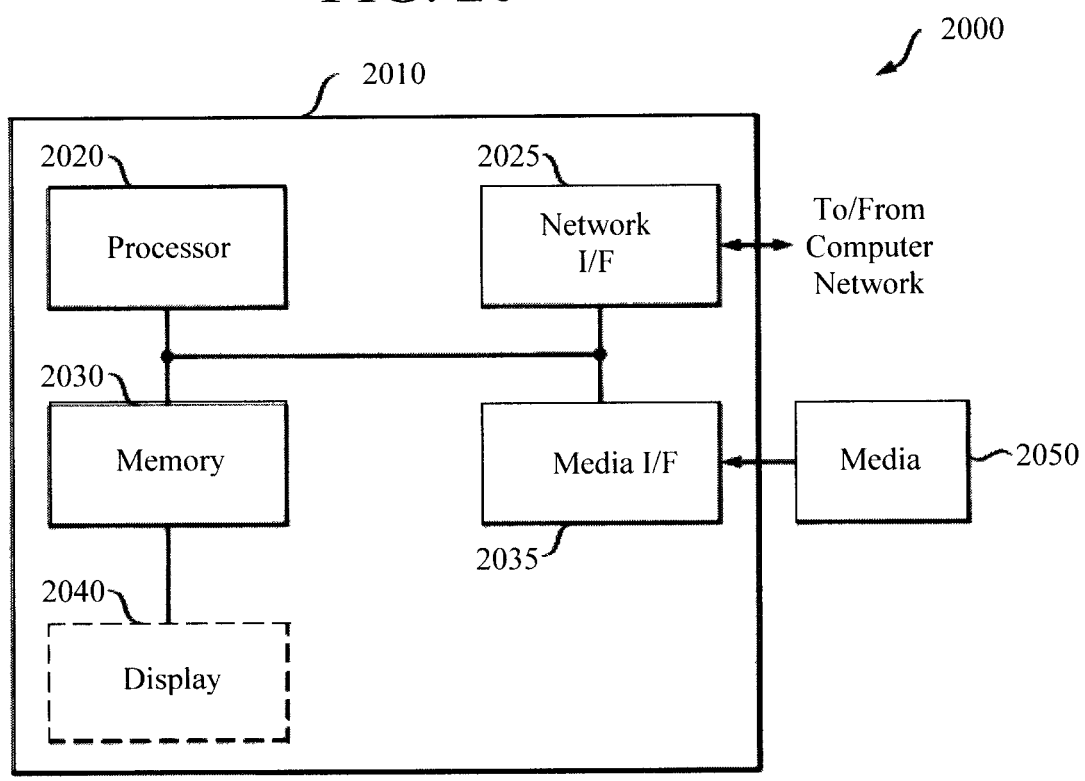
FIG. 20 is a diagram illustrating an exemplary apparatus for performing one or more of the methodologies provided herein according to an embodiment of the present invention.

Turning now to FIG. 20, a block diagram is shown of an apparatus 2000 for implementing one or more of the methodologies presented herein. By way of example only, apparatus 2000 can be implemented as the server CPU 504 in motes 500 (FIG. 5) and/or as the server 604 in system 6 (FIG. 6), and can be configured to perform one or more of the steps of methodology 1800 of FIG. 18 and/or one or more of the steps of methodology 1900 of FIG. 19. For instance, apparatus 2000 may be configured to obtain gas sensor data and wind data synchronously from a leak detection system having a network of interconnected motes comprising gas sensors and wind sensors, with the gas sensors arranged in a perimeter around a leak source; use the gas sensor data and wind data to identify the leak source location; and determine a magnitude of the gas leak using the leak source location and a distance d between the leak source location and a select one of the gas sensors from which the gas sensor data was obtained.

Apparatus 2000 includes a computer system 2010 and removable media 2050. Computer system 2010 includes a processor device 2020, a network interface 2025, a memory 2030, a media interface 2035 and an optional display 2040. Network interface 2025 allows computer system 2010 to connect to a network, while media interface 2035 allows computer system 2010 to interact with media, such as a hard drive or removable media 2050.

Processor device 2020 can be configured to implement the methods, steps, and functions disclosed herein. The memory 2030 could be distributed or local and the processor device 2020 could be distributed or singular. The memory 2030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 2020. With this definition, information on a network, accessible through network interface 2025, is still within memory 2030 because the processor device 2020 can retrieve the information from the network. It should be noted that each distributed processor that makes up processor device 2020 generally contains its own addressable memory space. It should also be noted that some or all of computer system 2010 can be incorporated into an application-specific or general-use integrated circuit.

Optional display 2040 is any type of display suitable for interacting with a human user of apparatus 2000. Generally, display 2040 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for identifying a location of a gas leak source, comprising the steps of:
    obtaining gas sensor data and wind data synchronously from a gas leak detection system having a network of interconnected motes comprising gas sensors and wind sensors, with the gas sensors arranged around possible gas leak sources in a given area of interest;
    identifying the location of the gas leak source using the gas sensor data and wind data; and
    determining a magnitude of gas leak from the gas leak source using the location of the gas leak source and a distance d between the location of the gas leak source and a select one of the gas sensors from which the gas sensor data was obtained, wherein the method further comprises the steps of:
    accumulating the gas sensor data and the wind data over a given time interval;
    determining an average wind direction over the time interval using the accumulated wind data;
    ranking the gas sensors using the accumulated gas sensor data based on a number of peaks the gas sensors received during the time interval; and
    identifying the location of the gas leak source using back propagation along the average wind direction from a given one of the gas sensors receiving a greatest number of peaks during the time interval.

2. The method of claim 1, further comprising the steps of:
    a) obtaining peak sensor data from at least a first one of the gas sensors synchronously with the wind data from the wind sensors indicating a first wind direction at a first time t1;
    b) determining a direct line path along the first wind direction through the first gas sensor;
    c) obtaining peak sensor data from at least a second one of the gas sensors synchronously with the wind data from the wind sensors indicating a second wind direction at a second time t2;
    d) determining a direct line path along the second wind direction through the second gas sensor;
    e) determining an intersection point between the direct line path along the first wind direction and the direct line path along the second wind direction; and
    f) identifying the location of the gas leak source using the intersection point.

3. The method of claim 2, further comprising the steps of:
    repeating the steps a-e to determine multiple intersection points; and
    accumulating the intersection points to form a point cloud.

4. The method of claim 3, further comprising the step of:
    determining a centroid of the point cloud to identify the location of the gas leak source.

5. The method of claim 4, further comprising the step of:
clustering the intersection points in the point cloud into at least one cluster.

6. The method of claim 5, further comprising the step of:
eliminating the intersection points that lie outside of the at least one cluster.

7. The method of claim 5, wherein the intersection points in the point cloud are clustered into multiple clusters, the method further comprising the step of:
separating the clusters based on a stability of the atmospheric conditions at different time periods.

8. The method of claim 3, further comprising the steps of:
creating boundaries around possible gas leak source locations; and
eliminating the intersection points that lie outside of the boundaries.

9. The method of claim 3, further comprising the steps of:
creating a heat map visually depicting a density of the intersection points; and
using the heat map to identify the location of the gas leak source based on the density of the intersection points.

10. The method of claim 1, wherein the gas sensors are arranged in a perimeter around the possible gas leak sources, and wherein at least one of the wind sensors is located within the perimeter of the gas sensors.

11. The method of claim 10, wherein at least one of the wind sensors is located outside of the perimeter of the gas sensors.

12. The method of claim 1, wherein the gas sensors are selected from the group consisting of: methane gas sensors, carbon dioxide gas sensors, carbon monoxide gas sensors, and combinations thereof.

13. The method of claim 1, wherein each of the motes comprising gas sensors has multiple gas sensors.

14. The method of claim 1, wherein at least one of the motes is mobile.

15. A gas leak detection system, comprising:
a network of interconnected motes having gas sensors and wind sensors, with the gas sensors arranged around possible gas leak sources in a given area of interest; and
at least one processor device, coupled to a memory, the processor device being implementable to:
obtain gas sensor data and wind data synchronously from the gas sensors and wind sensors;
identify a location of a gas leak source using the gas sensor data and wind data; and
determine a magnitude of gas leak from the gas leak source using the location of the gas leak source and a distance d between the location of the gas leak source and a select one of the gas sensors from which the gas sensor data was obtained, wherein the processor device is further implementable to:
accumulate the gas sensor data and the wind data over a given time interval;
determine an average wind direction over the time interval using, the accumulated wind data;
rank the gas sensors using the accumulated gas sensor data based on a number of peaks the gas sensors received during the time interval; and
identify the location of the gas leak source using back propagation along the average wind direction from a given one of the gas sensors receiving a greatest number of peaks during the time interval.

16. The gas leak detection system of claim 15, wherein the processor device is further implementable to:
a) obtain peak sensor data from at least a first one of the gas sensors synchronously with the wind data from the wind sensors indicating a first wind direction at a first time t1;
b) determine a direct line path along the first wind direction through the first gas sensor;
c) obtain peak sensor data from at least a second one of the gas sensors synchronously with the wind data from the wind sensors indicating a second wind direction at a second time t2;
d) determine a direct line path along the second wind direction through the second gas sensor;
e) determine an intersection point between the direct line path along the first wind direction and the direct line path along the second wind direction; and
f) identify the location of the gas leak source using the intersection point.

17. The gas leak detection system of claim 16, wherein the processor device is further implementable to:
repeat the steps a-e to determine multiple intersection points; and
accumulate the intersection points to form a point cloud.

18. A non-transitory computer program product for identifying a location of a gas leak source, the computer program product comprising a computer readable storage medium having program instructions embodied therewith, the program instructions executable by a computer to cause the computer to:
obtain gas sensor data and wind data synchronously from a gas leak detection system having a network of interconnected motes comprising gas sensors and wind sensors, with the gas sensors arranged around possible gas leak sources in a given area of interest;
identify the location of the gas leak source using the gas sensor data and wind data; and
determine a magnitude of gas leak from the gas leak source using the location of the gas leak source and a distance d between the location of the gas leak source and a select one of the gas sensors from which the gas sensor data was obtained, wherein the program instructions further cause the computer to:
accumulate the gas sensor data and the wind data over a given time interval;
determine an average wind direction over the time interval using the accumulated wind data;
rank the gas sensors using the accumulated gas sensor data based on a number of peaks the gas sensors received during the time interval; and
identify the location of the gas leak source using back propagation along the average wind direction from a given one of the gas sensors receiving a greatest number of peaks during the time interval.

* * * * *